Nov. 18, 1952   C. S. DAVIS, JR., ET AL   2,618,071
GEAR ALIGNMENT FIXTURE FOR GEAR SHAPERS
Filed April 26, 1950   4 Sheets-Sheet 1

INVENTORS
CHARLES S. DAVIS, JR
STANLEY HUMPHRIES
BY CARL A. RICARD.

Victor D. Behn
ATTORNEY

Nov. 18, 1952  C. S. DAVIS, JR., ET AL  2,618,071
GEAR ALIGNMENT FIXTURE FOR GEAR SHAPERS
Filed April 26, 1950  4 Sheets-Sheet 2

INVENTORS
CHARLES S. DAVIS, JR.
STANLEY HUMPHRIES
BY CARL A. RICARD.

ATTORNEY

Nov. 18, 1952  C. S. DAVIS, JR., ET AL  2,618,071
GEAR ALIGNMENT FIXTURE FOR GEAR SHAPERS
Filed April 26, 1950  4 Sheets-Sheet 3

INVENTORS
CHARLES S. DAVIS, JR.
STANLEY HUMPHRIES
BY CARL A. RICARD.

Victor D. Behn
ATTORNEY

Nov. 18, 1952     C. S. DAVIS, JR., ET AL     2,618,071
GEAR ALIGNMENT FIXTURE FOR GEAR SHAPERS
Filed April 26, 1950     4 Sheets-Sheet 4
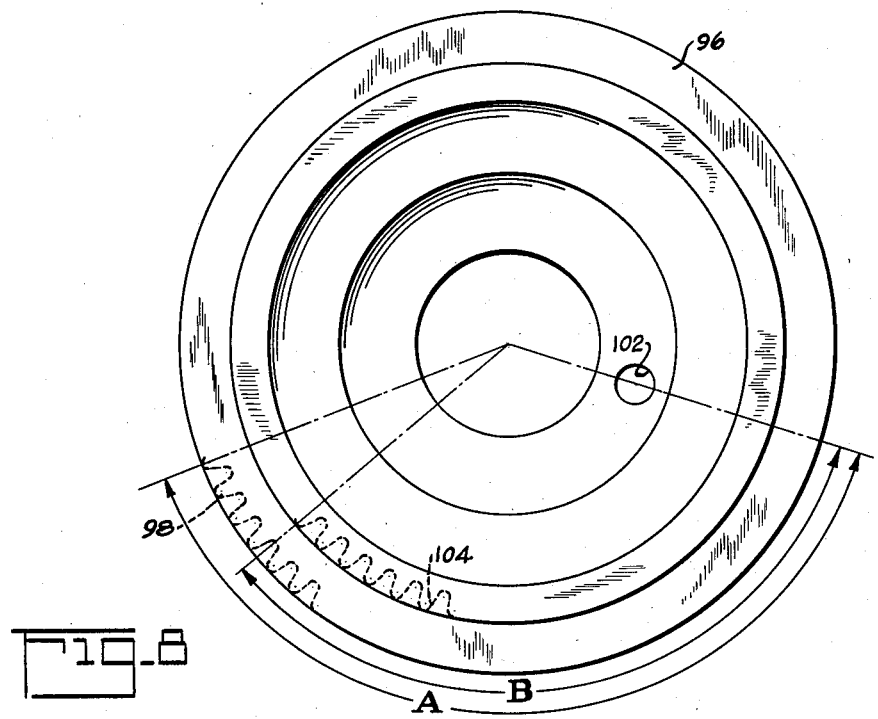
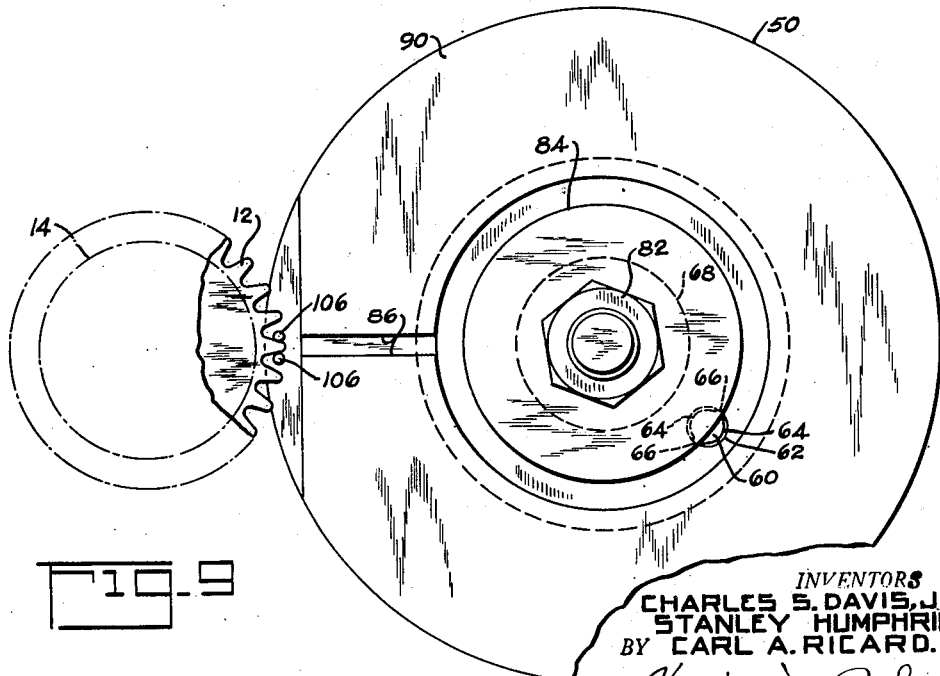
INVENTORS
CHARLES S. DAVIS, JR.
STANLEY HUMPHRIES
BY CARL A. RICARD.
ATTORNEY Patented Nov. 18, 1952

2,618,071

UNITED STATES PATENT OFFICE 2,618,071

GEAR ALIGNMENT FIXTURE FOR GEAR SHAPERS

Charles S. Davis, Jr., New York, N. Y., and Stanley Humphries, Wyckoff, and Carl A. Ricard, Fair Lawn, N. J., assignors to Curtiss-Wright Corporation, a corporation of Delaware Application April 26, 1950, Serial No. 158,154

6 Claims. (Cl. 33—185)

This invention relates to a fixture or apparatus for use in a shaping machine and is particularly directed to a fixture or apparatus for use in a gear shaping machine whereby the teeth of a gear can readily be cut so that there is a predetermined angular relation between the centerline of a gear tooth or an inter-tooth space and another part of said gear.

In the case of certain gears the centerline of a gear tooth or an inter-tooth space is required to have a certain angular relation with respect to some other portion of said gear—as for example a pilot hole, a spline on said gear, or if the gear is a compound gear comprising two gears the centerline of the tooth on one gear may be required to make a predetermined angle with the centerline of the tooth of the other gear. In cutting such gears, in which a predetermined angle is required between the centerline of the tooth of said gear and another part of said gear, the general practice is first to make a master gear in which said tooth centerline is located with very small tolerance. This master gear is then used for providing the proper rotative adjustment of the cutter on its spindle relative to the gear blank in order that each gear cut have said required predetermined angle between the centerline of a gear tooth and another part of said gear. Such a master gear is difficult and expensive to make because it is difficult to measure to the centerline of a gear tooth and because most tool shops are not equipped to grind gear teeth with the accuracy required of such a master gear.

An object of the present invention comprises the provision of a relatively simple fixture in place of said master gear whereby the rotative position of the cutter on its spindle can readily be adjusted relative to a gear tooth centerline locating part on the work spindle so that each gear cut has the required predetermined angle between a centerline of a gear tooth and a locating part on the gear mating with said work spindle locating part. This fixture comprises two parts. One of said fixture parts is a pin adapted to be co-axially secured to the cutter spindle. The other fixture part is a plate adapted to be co-axially secured to the work spindle. Said plate has a part corresponding to the tooth centerline locating part of the gear, said locating part cooperating with a complementary part on the work spindle for rotatively locating said plate about the axis of the work spindle. In addition said plate has an elongate slot extending radially from the axis of the plate, there being a predetermined angle between the centerline of said slot and the locating part on said plate equal to the predetermined angle required between the centerline of a tooth of a gear to be cut and the tooth centerline locating part of said gear.

Other objects of the invention will become apparent upon reading the annexed detailed description in connection with the drawing, in which:

Figure 8 is a plan view of the gear blank; and

Figure 9 is a view similar to Figure 6 but illustrating a modified form of the invention.

Figure 1:
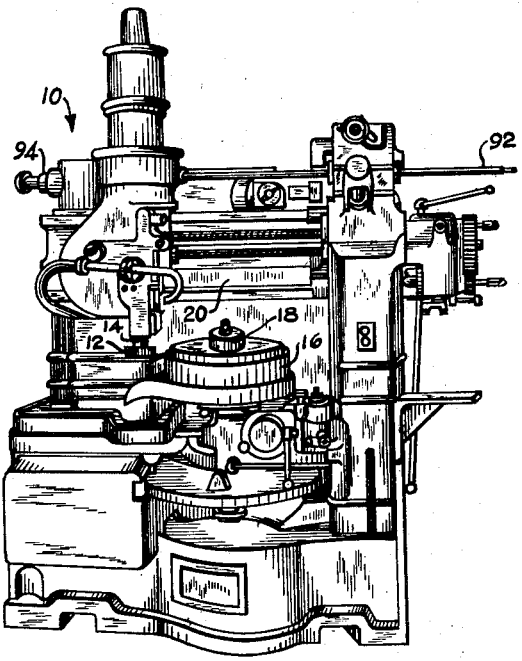
Figure 1 is a diagrammatic perspective view of a gear shaper machine.

Referring first to Figure 1 of the drawing, reference numeral 10 designates a conventional gear shaper machine comprising a cutter 12 shaped generally like a pinion and mounted on a vertical cutter spindle 14. The teeth of the cutter 12 have a profile conjugate to that of the gear to be cut. A gear blank 16, to be cut by the cutter 12, is mounted on the vertical work spindle 18. The cutter and work spindles are connected together for joint rotation such that the cutter 12 and gear blank being cut rotate on their pitch circles without slipping. The cutter spindle 14 is also mounted for reciprocation along its vertical axis, the teeth of its cutter 12 acting to cut teeth in the gear blank 16. In addition the cutter spindle 14 is mounted for movement along a horizontal cross-rail 20 disposed parallel to the plane of the vertical axes of the work and cutter spindles in order that the cutter can be fed radially into the gear blank.

Briefly, the gear shaper machine 10 operates as follows: With neither the cutter 12 nor the gear blank 16 rotating, the cutter 12 is reciprocated along its vertical axis and is fed toward the gear blank, metal being cut from said blank on one of the strokes of the cutter and on its other stroke the cutter is fed radially toward the axis of the work spindle 18. This feeding in motion of the cutter 12 continues only until the pitch circles of the cutter 12 and gear 16 being cut are tangent. Thereafter, for each reciprocation of the cutter, the cutter and gear blank are each rotated a small amount about their respective axes such that their pitch circles do not slip relative to each other. This relative rotation and reciprocation continues until all the gear teeth have been cut.

It sometimes is required that there be a predetermined angle, about the gear axis, between the centerline of a tooth on the gear and another part of said gear. Said gear part may comprise a hole in said gear, a spline on said gear etc., and in addition where the gear to be cut is a compound gear of two or more gears it may be required that there be a predetermined angle between the centerline of a tooth of one gear and the centerline of a tooth of the other gear. The usual practice is to make a master gear like the gears to be cut but to a very close tolerance. Such a master gear is hard to make because it is difficult to measure to the centerline of a tooth and because most tool shops are not equipped to grind gear teeth with the accuracy required of such a master gear.

In accordance with the present invention, it is not necessary to make such an expensive master gear and instead a relatively simple fixture apparatus is provided whereby the gear shaper machine can readily and accurately be set up so that each gear cut has the required predetermined angle between the centerline of a tooth of said gear and a part of said gear from which said centerline is located. This fixture apparatus comprises two parts, a first part adapted to be mounted on the cutter spindle and a second part adapted to be mounted on the work spindle. The second fixture part has been designed for a gear in which a predetermined angle is required between the centerline of a gear tooth and the radial line through the center of a hole in said gear.

Figure 2:
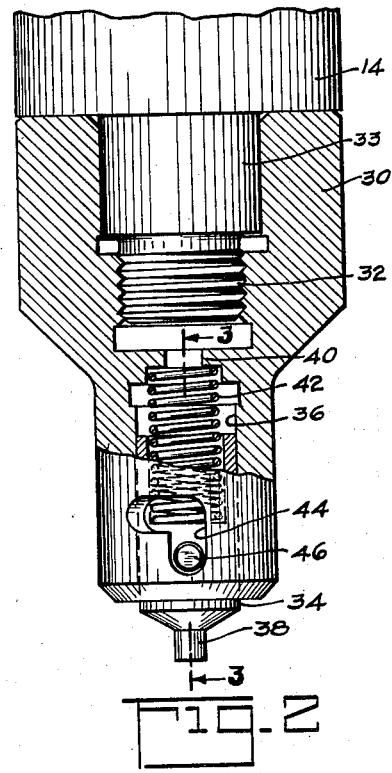
Figure 2 is a sectional view of a fixture part secured on a cutter spindle.
Figure 3:
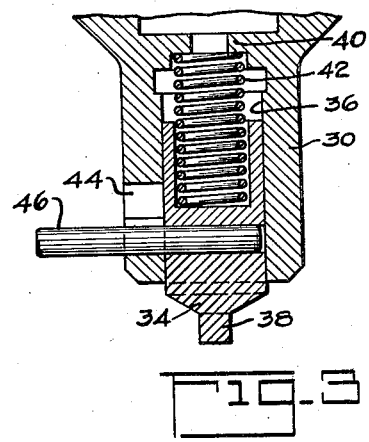
Figure 3 is a view partly in section taken along line 3—3 of Figure 2.

Referring now to Figures 2 and 3, said first fixture part comprises a sleeve member 30 having internal threads for connection to the threads 32 of the cutter spindle 14, the spindle surface 33 serving to co-axially position the sleeve 30 on the cutter spindle 14. A pin or plunger 34 is slidably fitted within the bore 36 of said sleeve, said pin having a reduced diameter portion 38 at its end projecting from the sleeve 30. The sleeve 30 also has an internal shoulder 40 and a spring 42 is disposed between the pin 34 and said shoulder for urging the pin 34 axially outwardly from said sleeve. In addition the sleeve 30 is provided with an L-shaped slot 44 and an arm 46, secured within a transverse bore in the pin 34, projects through said slot. With this construction of Figures 2 and 3, the arm 46 in cooperation with the slot 44 limits movement of the pin 34 outwardly from the sleeve 30 by the spring 42. In addition by means of the arm 46 the pin 34 may be moved inwardly into the sleeve 30 against the spring 42 and, by rotating the pin 46 into the horizontal portion of the L-shaped slot 44, the pin 34 is releasably locked in this retracted position.

Figure 4:
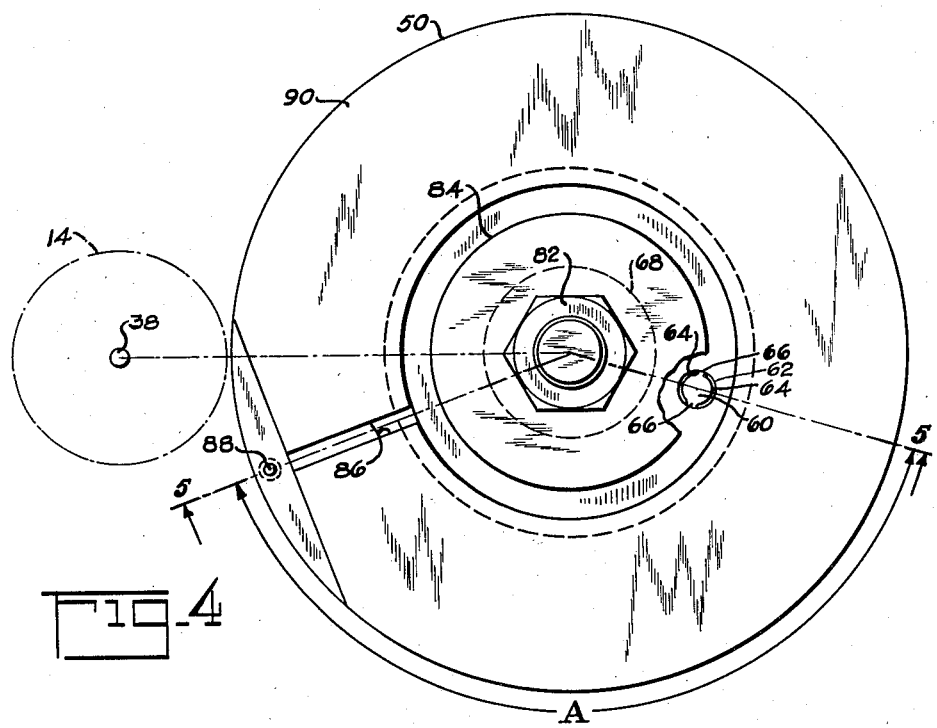
Figure 4 is a plan view of the fixture plate secured on the work spindle and schematically illustrating the fixture part of Figure 2 on the cutter spindle.
Figure 5:
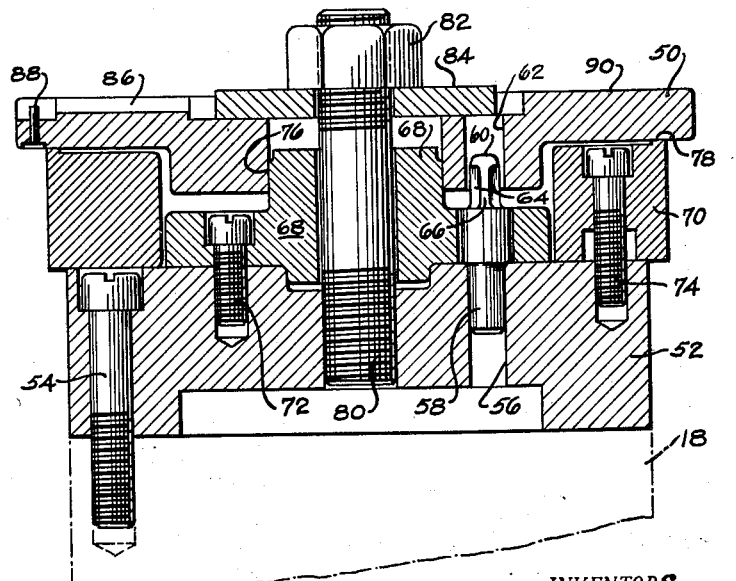
Figure 5 is a sectional view taken along line 5—5 of Figure 4.

Referring now to Figures 4 and 5, said second fixture part comprises an annular plate 50 adapted to be co-axially mounted on the work spindle 18. For this purpose a base plate 52 is first secured to the work spindle 18 by a plurality of circumferentially spaced screws 54, only one such screw being illustrated. The base plate 52 is provided with a bore 56 within which a locating pin 58 is secured as by a press fit. The end 60 of the pin 58, remote from the base plate 52, is adapted to register with a hole 62 in the plate 50 to rotatively locate or position said plate relative to the axis of the work spindle. The hole 62 in the plate 50 is similar to the hole in each gear blank with reference to which the centerline of a tooth is located. As best seen in Figure 4, the diametrically opposed portions of the pin end 60 adjacent to and remote from the axis of the work spindle 18 are cut back or relieved as indicated at 64 thereby leaving lands 66 which serve to accurately determine the rotative position of the plate 50 about the axis of the work spindle 18. Thus, since the pin 60 is relieved at 64, said pin does not interfere with the alignment of the plate 50 with the axis of the work spindle 18. Before mounting the plate 50 on the work spindle base plate 52, first and second rings 68 and 70 are secured to the work spindle base plate 52 by a plurality of screws 72 and a plurality of screws 74 respectively, only one of each of these screws being illustrated. The ring 68 is provided with an accurately ground cylindrical surface 76 about which the plate 50 is adapted to be piloted for co-axial alignment of said plate with the work spindle 18. The second ring 70 has a hard flat horizontal surface 78 for engagement with the plate 50. Preferably the rings 68 and 70 are made in two pieces (as illustrated) instead of in one piece—for example for convenience of fabrication. After the rings 68 and 70 are secured to the work spindle base plate 52 the plate 50 is mounted thereon. A stud 80 secured to the base plate 52 projects upwardly and above the plate 50 and said plate 50 is rigidly secured in position by screwing a nut 82 down along the stud 80 against a washer 84 bearing against the plate 50.

The plate 50 has an elongate slot 86 extending radially relative to the axis of said plate, said slot having a width equal to the diameter of the reduced diameter end 38 of the pin 34. The angle A about the axis of the plate 50 between the radial centerline of the slot 86 and the radial line through the center of the hole 62 is the same as the required angle between the centerline of the tooth on the gear to be cut and the radial line through the center of a hole on said gear (see Figure 8). The plate 50 also has a pin 88 projecting therefrom parallel to the axis of said plate and with the axis of said pin intersecting the radial centerline of the slot 86.

With the pin 34 and the plate 50 mounted on the gear shaping machine as described, these parts initially will have relative positions such as illustrated in Figure 4. Then with the pin 34 in its retracted position, the cutter spindle 14 is moved along its guide rail 20 toward its work spindle 18 until the pin 34 is disposed over the path of rotation of the plate slot 86. The arm 46 on the pin 34 is then rotated into alignment with the vertical portion of the slot 44 whereupon the spring 42 urges the pin 34 against the horizontal upper surface 90 of the plate 50. The work spindle 18 and its plate 50 are then slowly rotated until the end 38 of the pin 34 drops into the plate slot 86. This adjustment can be accomplished on conventional gear shaper machines by manually rotating the work spindle 18 and the cutter spindle 14. Thus in the machine 10 illustrated in Figure 1, manual rotation of the shaft 92 rotates the cutter spindle 14, without reciprocation, and through the normally engaged clutch 94 also rotates the work spindle 18. With this adjustment, the radial centerline of the plate slot 86 is on a line joining the axes of the cutter and work spindles.

Figure 6:
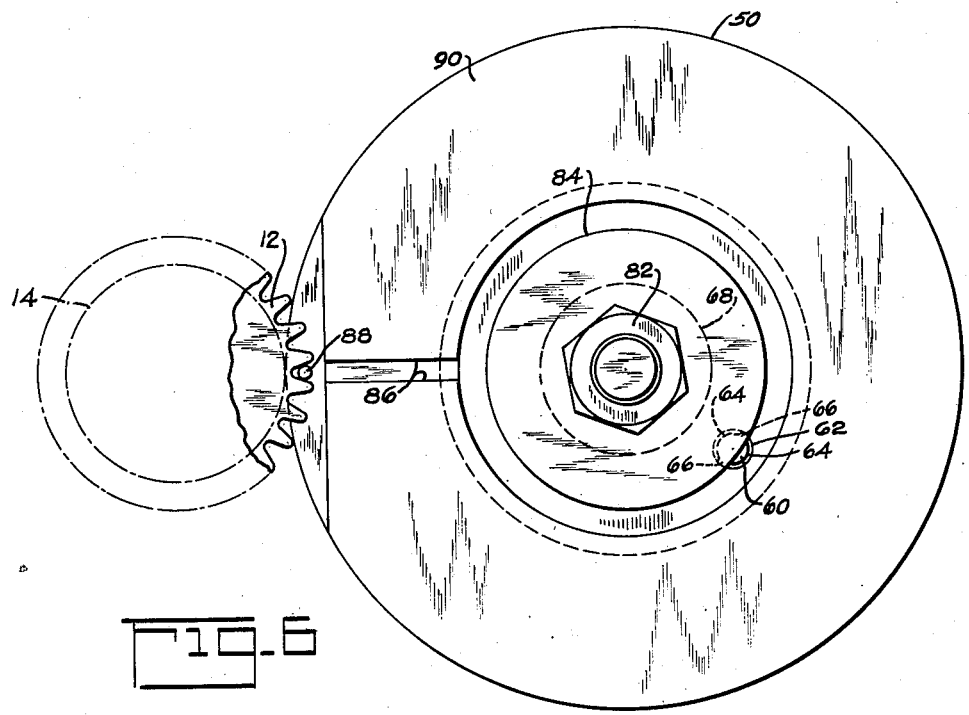
Figure 6 is a view similar to Figure 5 but illustrating the fixture plate of Figure 5 positioned on the work spindle with the teeth of a cutter meshing with a pin on said plate.

The cutter spindle 14 is now moved away from the work spindle 18 along its cross-rail 20 and the cutter 12 is clamped on said spindle by a nut threaded on the cutter spindle threads 32, said cutter being co-axially positioned on the cutter spindle by its surface 33. The clutch 94 is now disengaged in order to permit rotation of the cutter 12 while the plate 50 remains in its set position in which the radial centerline of its slot 86 passes through the axes of the work and cutter spindles. The cutter spindle is now moved toward the work spindle so that the pin 88 on the plate 50 enters into an inter-tooth space on the cutter 12. At the same time the cutter 12 is rotatively positioned by manual rotation of the shaft 92 so that the pin 88 is snugly received within said inter-tooth space (see Figure 6). The clutch 94 is now re-engaged. With this last adjustment, the cutter 12 is positioned so that if the machine 10 were operated as thus set up, said cutter would cut a tooth in the plate 50 having a centerline on the radial line passing through the center of the pin 88 whereby there would be the required predetermined angle A between said tooth centerline and the locating hole 62 in the plate 50.

Figure 7:
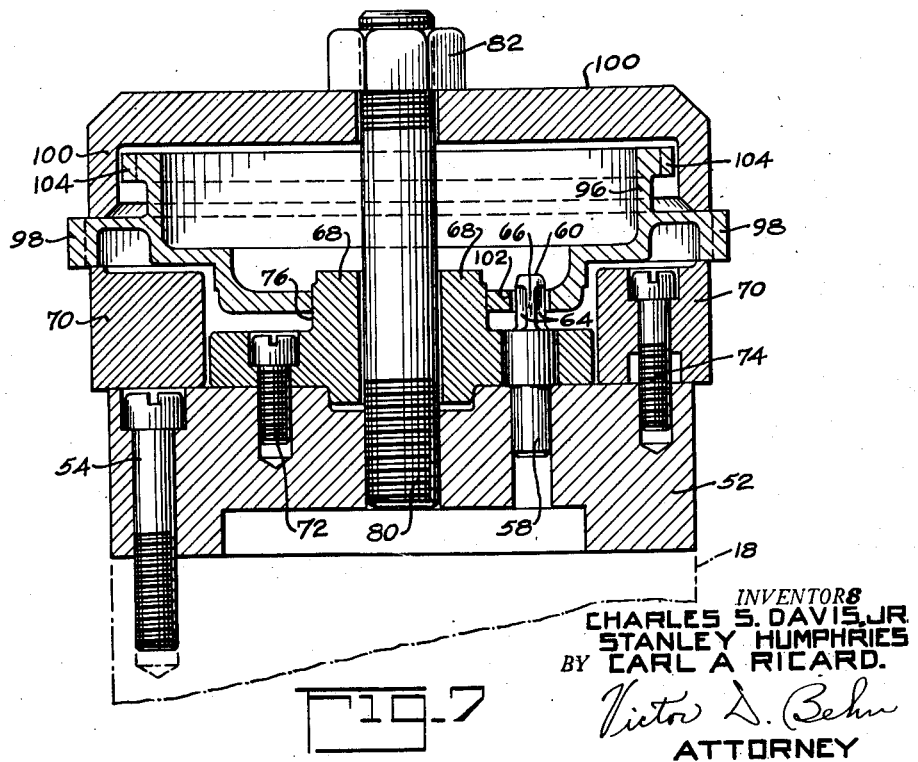
Figure 7 is a sectional view similar to Figure 5 but illustrating a gear blank mounted on the work spindle.

The cutter spindle is now moved away, along its guide rail 20, from the work spindle 18 and the plate 50 is removed from the work spindle. Referring now to Figures 7 and 8, a gear blank, for example the blank 96, is placed on the work spindle 18 so that gear teeth 98 may be cut thereon, said teeth being illustrated by dot and dash lines and said gear blank being held in position on the work spindle 18 by a clamping plate 100. The gear blank 96 has a hole 102 similar to the hole 62 in the plate 50 so that the end 60 of the pin 58 is received within said hole 102 thereby angularly locating or positioning the gear blank 96 about the axis of the work spindle. With the machine set up, as previously described, the teeth 98 will be cut in the gear blank so that the centerline of one of said teeth will have the required angle A with the radial line through the locating hole 102.

As illustrated, the gear blank 96, unlike the gear blank 16 of Figure 1, is formed for a compound gear so that gear teeth 104 (illustrated by dot and dash lines) as well as gear teeth 98 are to be cut in said blank. If the relation between the gear teeth and the locating hole 102 is also to be such that there is a predetermined angle, equal to the angle A, between the centerline of one of the teeth 104 and the radial line through the hole 102 then the machine 10 is also set up for cutting the gear teeth 104. If as illustrated in Figure 8, however, it is specified that the centerline of a gear tooth 104 is required to make an angle B, different from the angle A, with the radial line through the center of the hole 102, then in order to cut the teeth 104 of the gear 96 the machine 10 must first be set up using a plate corresponding to the plate 50 but having an angle B, instead of an angle A, between the centerline of its slot 86 and the radial line through its hole 62.

Obviously if the centerline of a tooth on the gear to be cut is located with reference to some feature other than a hole in the gear, as for example an internal spline, then the work spindle would be provided with a complementary spline formation in place of the pin 60. In addition, in place of the hole 62 the plate 50 would be provided with a spline similar to the tooth centerline locating spline of the gear to be cut and the angle between the plate slot 86 and its said spline would be made equal to the angle required between the centerline of a tooth on said gear and its said locating spline. It should be clear therefore that the invention can be used for cutting any gear in which a gear tooth is located with reference to some other part of the gear regardless of the nature of said locating part. Also instead of the projecting pin 88, the plate 50 could be provided with a projecting gear tooth or other projection having a profile conjugate to the profile of the cutter teeth such that the centerline of said gear tooth or other projection coincided with the centerline of the plate slot 86. Obviously, however, it is much simpler to provide a cylindrical projecting pin 88 on the centerline of said slot in place of such a tooth-shaped projection.

Instead of the centerline of a tooth, the centerline of an inter-tooth space may be specified as having a predetermined angular relation with another part of the gear. The above described fixture apparatus and procedure can be used for setting up the machine 10 for cutting such a gear except (as illustrated in Figure 9) the pin 88 on the plate 50 is replaced by a pair of pins 106 symmetrically offset on opposite sides of the centerline of the plate slot 86. The spacing between the pins 106 is such as to receive a tooth of the cutter 12 therebetween so as to align said tooth with the radial centerline of the plate slot 86. For setting up the machine 10 to cut a gear in which a predetermined angular relation is specified between the centerline of an inter-tooth space and another part of said gear, the plate 50 is preferably provided with two offset pins 106, as illustrated, although it is possible to set up the machine with but one offset pin adapted to be snugly received in an inter-tooth space of the cutter. As already mentioned the pin 88 can be replaced by a gear tooth or other projection on the plate 50 having a profile conjugate to the profile of the cutter teeth. Likewise each of the pins 106 may be replaced by a projection on the plate 50 having a similar conjugate profile.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. Apparatus for use in setting up a gear blank in a gear shaper machine having a cutter spindle and a work spindle: said apparatus comprising a plate adapted to be mounted on the work spindle prior to and in place of said gear blank; cooperating formations on said plate and work spindle for rotatively locating said plate on the work spindle relative to the axis of said work spindle, said plate having an elongate radially extending slot; and a cylindrical pin adapted to be co-axially secured to said cutter spindle prior to and in place of a cutter, said pin having a diameter equal to the width of said slot and being receivable in said slot for rotatively positioning said work spindle and plate relative to the cutter spindle so that the radial centerline of said slot intersects the axes of said cutter and work spindles.

2. Apparatus for use in setting up a gear blank in a gear shaper machine: said apparatus comprising a plate adapted to be mounted on the work spindle of said machine prior to and in place of said gear blank; cooperating formations on said plate and work spindle for rotatively locating said plate on the work spindle relative to the axis of said work spindle, said plate having an elongate radially extending slot; pin means projecting from said plate, said pin means being arranged for meshing engagement with the cutter teeth for rotative adjustment of the cutter about the axis of the cutter spindle; and a cylindrical pin adapted to be co-axially secured to said cutter spindle prior to and in place of said cutter, said cylindrical pin having a diameter equal to the width of said slot and being receivable in said slot for rotatively positioning said plate and work spindle relative to the cutter spindle so that the radial centerline of said slot intersects the axes of said cutter and work spindles.

3. Apparatus for use in setting up a gear blank in a gear shaper machine having a cutter spindle and a work spindle: said apparatus comprising a plate adapted to be mounted on the work spindle prior to and in place of said gear blank; cooperating formations on said plate and work spindle for rotatively locating said plate on the work spindle relative to the axis of said work spindle, said plate having an elongate radially extending slot; a pin projecting from the face of said plate, the axis of said pin intersecting the radial centerline of said slot and said pin being receivable within the inter-tooth space of a cutter for rotative adjustment of said cutter about the axis of the cutter spindle; and a cylindrical pin adapted to be co-axially secured to said cutter spindle prior to and in place of said cutter, said cylindrical pin having a diameter equal to the width of said slot and being receivable in said slot for rotatively positioning said plate and work spindle relative to the cutter spindle so that the radial centerline of said slot intersects the axes of said cutter and work spindles.

4. Apparatus for use in setting up a gear blank in a gear shaper machine: said apparatus comprising a plate adapted to be mounted on the work spindle of said machine prior to and in place of said gear blank; cooperating formations on said plate and work spindle for rotatively locating said plate on said work spindle relative to the axis of said work spindle, said plate having an elongate slot extending in a radial direction relative to the work spindle when said plate is mounted on said work spindle.

5. Apparatus for use in setting up a gear blank in a gear shaper machine: said apparatus comprising a plate adapted to be mounted on the work spindle of said machine prior to and in place of said gear blank, said plate having an elongate slot and a pin projecting from said plate; and cooperating formations on said plate and work spindle for rotatively locating said plate on said work spindle relative to the axis of said work spindle, said slot and pin being so disposed on said plate that when said plate is mounted on the work spindle said slot extends in a radial direction relative to the work spindle and the axis of said pin is parallel to the work spindle.

6. Apparatus for use in setting up a gear blank in a gear shaper machine: said apparatus comprising a plate adapted to be mounted on the work spindle of said machine prior to and in place of said gear blank and having an elongate slot and a pin projecting from said plate with the axis of said pin intersecting the centerline of said slot; and cooperating formations on said plate and work spindle for rotatively locating said plate on said work spindle relative to the axis of said work spindle; said slot and pin being disposed on said plate so that when said plate is mounted on the work spindle said slot extends in a radial direction relative to the work spindle and the axis of said pin is parallel to the work spindle.

CHARLES S. DAVIS, Jr.
STANLEY HUMPHRIES.
CARL A. RICARD.

REFERENCES CITED

The following references are of record in the file of this patent:

UNITED STATES PATENTS

| Number | Name | Date |
| --- | --- | --- |
| 789,860 | Le Blond et al. | May 16, 1905 |
| 1,034,927 | Oehler | Aug. 6, 1912 |
| 1,216,470 | Lehr | Feb. 20, 1917 |
| 2,150,313 | Bauer | Mar. 14, 1939 |